(12) United States Patent
Pokhrel

(10) Patent No.: US 11,887,318 B2
(45) Date of Patent: Jan. 30, 2024

(54) OBJECT TRACKING

(71) Applicant: NOKIA SOLUTIONS AND NETWORKS OY, Espoo (FI)

(72) Inventor: Niroj Pokhrel, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/059,794

(22) Filed: Nov. 29, 2022

(65) Prior Publication Data

US 2023/0087330 A1  Mar. 23, 2023

Related U.S. Application Data

(63) Continuation of application No. 17/274,854, filed as application No. PCT/FI2018/050673 on Sep. 17, 2018, now Pat. No. 11,514,585.

(51) Int. Cl.
| | |
|---|---|
| *G06T 7/277* | (2017.01) |
| *G06T 7/215* | (2017.01) |
| *G06T 7/11* | (2017.01) |
| *G06T 7/70* | (2017.01) |
| *G05B 13/02* | (2006.01) |
| *H04N 7/18* | (2006.01) |

(Continued)

(52) U.S. Cl.
CPC ............ *G06T 7/277* (2017.01); *G05B 13/027* (2013.01); *G06T 7/11* (2017.01); *G06T 7/215* (2017.01); *G06T 7/70* (2017.01); *G06V 10/24* (2022.01); *H04N 7/18* (2013.01); *H04N 23/69* (2023.01); *G06T 2207/10016* (2013.01); *G06T 2207/20084* (2013.01); *G06T 2207/20132* (2013.01)

(58) Field of Classification Search
CPC ............ G06T 7/277; G06T 7/215; G06T 7/11; G06T 7/70; G06T 2207/10016; G06T 2207/20084; G06T 2207/20132; G06V 10/24; H04N 23/69; H04N 7/18; G05B 13/027
USPC ......................................................... 348/144
See application file for complete search history.

(56) References Cited

U.S. PATENT DOCUMENTS

| | | | |
|---|---|---|---|
| 10,037,613 B1 | 7/2018 | Becker et al. | |
| 2014/0010456 A1* | 1/2014 | Merler | .................... G06T 7/277 |
| | | | 382/191 |

(Continued)

OTHER PUBLICATIONS

Extended European Search Report for European Application No. 18933853.6 dated Apr. 12, 2022, 10 pages.

(Continued)

*Primary Examiner* — Allen C Wong
(74) *Attorney, Agent, or Firm* — ALSTON & BIRD LLP

(57) ABSTRACT

An apparatus, method and computer program is described comprising detecting a first object in a first image of a sequence of images using a neural network, wherein the means for detecting the first object provides an object area indicative of a first location of the first object; and tracking the first object, wherein the means for tracking the first object further comprises generating a predicted future location of the first object and generating an updated location of the first object using the neural network. The means for generating the predicted future location of the first object may, for example, receive said object area indicative of a first location of the first object and may receive said updated location information of the first object.

20 Claims, 10 Drawing Sheets

(51) Int. Cl.
*H04N 23/69* (2023.01)
*G06V 10/24* (2022.01)

(56) References Cited

U.S. PATENT DOCUMENTS

| | | | |
|---|---|---|---|
| 2017/0094184 A1 | 3/2017 | Gao et al. | |
| 2017/0169314 A1 | 6/2017 | Dijkman et al. | |
| 2017/0272181 A1 | 9/2017 | Gudi et al. | |
| 2017/0301109 A1 | 10/2017 | Chan et al. | |
| 2018/0158197 A1* | 6/2018 | Dasgupta | H04N 13/282 |
| 2019/0114807 A1 | 4/2019 | Saa-Garriga et al. | |

OTHER PUBLICATIONS

First Examination Report for Indian Application No. 202147017192 dated Feb. 11, 2022, 8 pages.
International Search Report and Written Opinion for Patent Cooperation Treaty Application No. PCT/FI2018/050673 dated Mar. 15, 2019, 16 pages.
Kendall et al., "On-Board Object Tracking Control of a Quadcopter with Monocular Vision", 2014 International Conference on Unmanned Aircraft Systems (ICUAS) (May 27-30, 2014), 8 pages.
Lee, A., "Comparing Deep Neural Networks and Traditional Vision Algorithms in Mobile Robotics", Swarthmore University (2005), 9 pages.
Ma et al., "Hierarchical Convolutional Features for Visual Tracking", 2015 IEEE International Conference on Computer Vision (ICCV) (Dec. 13, 2015), 9 pages.
Non-Final Office Action for U.S. Appl. No. 17/274,854 dated Feb. 15, 2022.
Notice of Allowance for U.S. Appl. No. 17/274,854 dated Jul. 25, 2022.
Raja et al., "Vision Based Tracking for Unmanned Aerial Vehicle", Advances in Aerospace Science and Applications, vol. 4, No. 1 (2014), pp. 59-64.
Redmon et al., "YOLO: Real-Time Object Detection", [online] [Retrieved Apr. 9, 2021] Retrieved via the Internet: <URL: https://pjreddie.com/darknet/yolo/?utm_source=next.36kr.com>. (2018), 9 pages.
Ren et al., "A Face Tracking Method in Videos Based on Convolutional Neural Networks", International Journal of Pattern Recognition and Artificial Intelligence, vol. 32, No. 12 (Jun. 28, 2018), 18 pages.
Venkataramanan, S., "Visual Object Tracking and Following for DIY Drones", [online] [Retrieved Apr. 9, 2021] Retrieved from the Internet: <URL: https://diydrones.com/profiles/blogs/visual-object-tracking-and-following-for-diy-drones-1>. (Aug. 4, 2016), 4 pages.

* cited by examiner

OBJECT TRACKING

CROSS REFERENCE TO RELATED APPLICATIONS

This application is a continuation of U.S. application Ser. No. 17/274,854, filed Mar. 10, 2021, which is a national phase entry of International Application No. PCT/FI2018/050673, filed Sep. 17, 2018, all of which are incorporated herein by reference in their entirety.

FIELD

This specification relates to object detection and tracking.

BACKGROUND

There are many circumstances where it may be desirable to be able to detect and track an object. Such circumstances include: search and rescue scenarios in which a missing person or pet is being sought; and surveillance and security applications, for example where an unwanted person at a property may be detected and tracked.

SUMMARY

In a first aspect, this specification describes an apparatus comprising: means for detecting a first object (such as a vehicle, a person, an animal or some other object) in a first image of a sequence of images using a neural network, wherein the means for detecting the first object provides an object area (such as a bounding box) indicative of a first location of the first object; and means for tracking the first object, wherein the means for tracking the first object further comprises: means for generating a predicted future location of the first object; and means for generating an updated location of the first object using the neural network. The first object may be moving. Alternatively, or in addition, the apparatus may be moving. The means for generating the predicted future location of the first object may be a Kalman filter (or an extended Kalman filter).

In some embodiments, one or more predicted future locations of the first object may be generated for each generation of an updated location of the first object.

The means for generating the predicted future location of the first object (e.g. a Kalman filter) may receive said object area indicative of the first location of the first object and may receive said updated location information of the first object. Thus, the means for generating the predicted further location (e.g. a Kalman filter) may receive an object area indicative of the first location and may also receive updated location information (e.g. when available), for example from the neural network.

Some embodiments may further comprise means for cropping the first image to provide a first cropped image, at least partially based on the predicted future location and/or the updated location of the first object, wherein the first cropped image includes said first object. The said updated location of the first object may be generated from said cropped image.

Some embodiments may comprise means for generating a control signal for changing a field of view of a means for obtaining the sequence of images. The field of view may be changed depending, for example, on the predicted location of the first object. The said control signal may comprise a zoom control signal and/or a gimbal control signal. For example, the zoom control and/or the gimbal control may be controlled such that the field of view is directed towards a location (predicted or determined) of the first object.

In some embodiments, the control signal may be generated when a deviation (e.g. a prediction of deviation) of the first object away from a centre of the first image or the first cropped image is higher than a threshold.

The prediction of the future location of the first object may be used for tracking the first object. For example, the prediction may be used to determine that there is a high chance that the first object is within the region predicted by the means for predicting the future location of the first object. This prediction may be used in selecting a region to be searched (e.g. minimising a region to be searched), for example by a neural network.

The means for generating the predicted future location of the first object may generate multiple prediction instances (for example a sequence of prediction instances) for each updated location generated by the means for generating the updated location of the first object using the neural network.

Some embodiments may further comprise means for training the neural network. The means for training the neural network may take many forms. For example, the means for training the neural network may be configured to collect data at at least one of: different altitudes, different zoom levels, different rotations, and/or different shearing. Many alternative arrangements are possible and will be apparent to those skilled in the art.

Some embodiments may include means for obtaining the sequence of images, wherein the sequence of images includes the first image.

The said apparatus may, for example, be a drone or an unmanned aerial vehicle (e.g. a moving drone or unmanned aerial vehicle).

The said means may comprise: at least one processor; and at least one memory including computer program code, the at least one memory and the computer program code configured, with the at least one processor, to cause the performance of the apparatus.

In a second aspect, this specification describes a method comprising: detecting a first object (such as a vehicle, a person, an animal or some other object) in a first image of a sequence of images using a neural network, wherein the means for detecting the first object provides an object area (such as a bounding box) indicative of a first location of the first object; and tracking the first object, wherein tracking the first object further comprises generating a predicted future location (for example using a Kalman filter) of the first object and generating an updated location of the first object using the neural network.

In some embodiments, one or more predicted future locations of the first object may be generated for each generation of an updated location of the first object.

Generating the predicted future location of the first object may comprise receiving said object area indicative of the first location of the first object and receiving said updated location information of the first object. Thus, generating the predicted further location (e.g. using a Kalman filter) may receive an object area indicative of the first location and may also receive updated location information (e.g. when available), for example from the neural network.

Some embodiments may further comprise cropping the first image to provide a first cropped image, at least partially based on the predicted future location and/or the updated location of the first object.

Some embodiments may comprise generating a control signal (such as a zoom control signal and/or a gimbal control signal) for changing a field of view of a means for obtaining the sequence of images.

In some embodiments, the control signal may be generated when a deviation (e.g. a prediction of deviation) of the first object away from a centre of the first image or the first cropped image is higher than a threshold.

Generating the predicted future location of the first object may generate multiple prediction instances (for example a sequence of prediction instances) for each updated location generated by the means for generating the updated location of the first object using the neural network.

Some embodiments may further comprise training the neural network.

In a third aspect, this specification describes any apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: detect a first object in a first image of a sequence of images using a neural network, wherein the means for detecting the first object provides an object area indicative of a first location of the first object; and track the first object, wherein tracking the first object comprises generating a predicted future location of the first object and generating an updated location of the first object using the neural network.

In a sixth aspect, this specification describes a computer-readable medium (such as a non-transitory computer readable medium) comprising program instructions stored thereon for performing at least the following: detecting a first object (such as a vehicle, a person, an animal or some other object) in a first image of a sequence of images using a neural network, wherein the means for detecting the first object provides an object area (such as a bounding box) indicative of a first location of the first object; and tracking the first object, wherein tracking the first object further comprises generating a predicted future location (for example using a Kalman filter) of the first object and generating an updated location of the first object using the neural network.

In a seventh aspect, this specification describes an apparatus comprising: at least one processor; and at least one memory including computer program code which, when executed by the at least one processor, causes the apparatus to: detect a first object in a first image of a sequence of images using a neural network, wherein the means for detecting the first object provides an object area indicative of a first location of the first object; and track the first object, wherein tracking the first object comprises generating a predicted future location of the first object and generating an updated location of the first object using the neural network.

In an eighth aspect, this specification describes an apparatus comprising: a detection module (which detection module may include a neural network) for detecting a first object (such as a vehicle, a person, an animal or some other object) in a first image of a sequence of images (e.g. using a neural network), wherein the detection module provides an object area (such as a bounding box) indicative of a first location of the first object; and a tracking module for tracking the first object, wherein the tracking module further comprises: a prediction module (such as a Kalman filter or an extended Kalman filter) for generating a predicted future location of the first object; and updated location module (which may include a neural network) for generating an updated location of the first object using the neural network.

The term module has physical existence, for example as circuitry independent from other modules or as an apparatus independent of other modules. It is possible for different modules to be located differently. A module apparatus connotes a physical apparatus such as a hardware device or component.

BRIEF DESCRIPTION OF THE DRAWINGS

Example embodiments will now be described, by way of non-limiting examples, with reference to the following schematic drawings.

DETAILED DESCRIPTION

Figure 1:
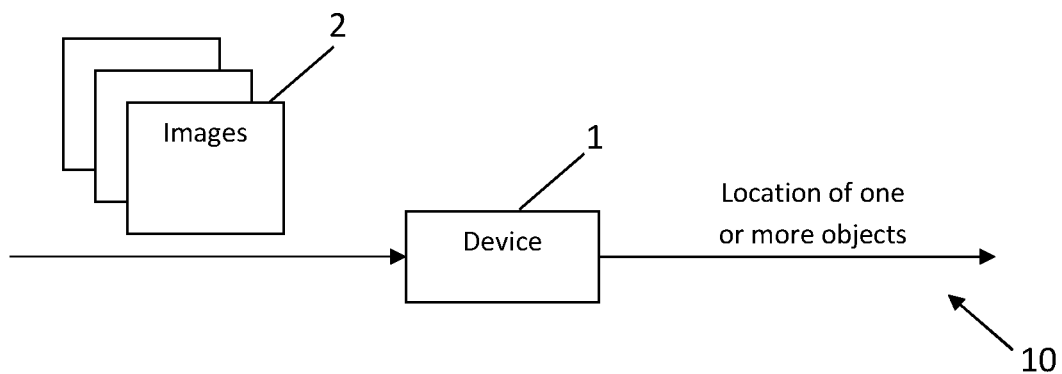
FIG. 1 is a block diagram of a system in accordance with an example embodiment.

In the description, like reference numerals relate to like elements throughout.

FIG. 1 is a block diagram of a system, indicated generally by the reference numeral 10, in accordance with an example embodiment. System 10 comprises a device 1. A sequence of images 2 is provided to device 1 as an input, and device 1 provides a location of one or more objects as an output. The sequence of images 2 may be part of a video captured in real-time by a camera. The camera may be a part of or may be connected to the device 1. For example, device 1 may be a drone, a security camera (such as a Closed-circuit television (CCTV)), or any other device that may be used for real time video capturing. The device 1 may provide a location of one or more objects that may be detected in one or more of the sequence of images.

Figure 2:
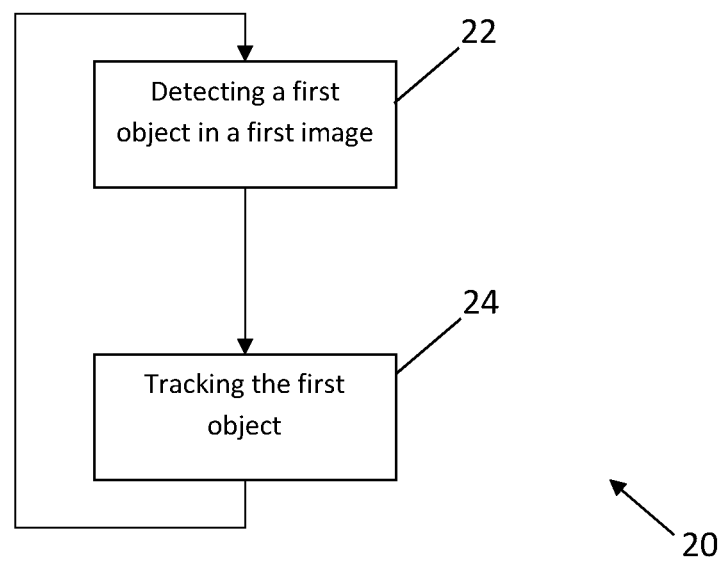
FIGS. 2 to 4 are flow charts showing algorithms in accordance with example embodiments.

FIG. 2 is a flow chart showing an algorithm, indicated generally by the reference numeral 20, in accordance with an example embodiment. The algorithm 20 starts at operation 22 where a first object is detected at a detection stage. Then, at operation 24, the detected first object is tracked at a tracking stage. As discussed below, the operation 22 may be implemented by a detection module and the operation 24 may be implemented using a tracking module. The tracking module may include a prediction module and an updated location module.

The term module has physical existence, for example as circuitry independent from other modules or as an apparatus independent of other modules. It is possible for different modules to be located differently. A module apparatus connotes a physical apparatus such as a hardware device or component.

As described further below with respect to FIG. 3, the detecting operation 22 comprises detecting a first object in a first image of a sequence of images using a neural network (e.g. a convolutional neural network) and providing an object area indicative of a current location of the first object. As described further below with respect to FIG. 4, the tracking operation 24 comprises predicting a future location of an object being tracked and updating location information of the tracked object using a neural network. In the event that the tracking of the object is lost in the operation 24, the operation 22 may be repeated, such that the object is detected again.

Figure 3:
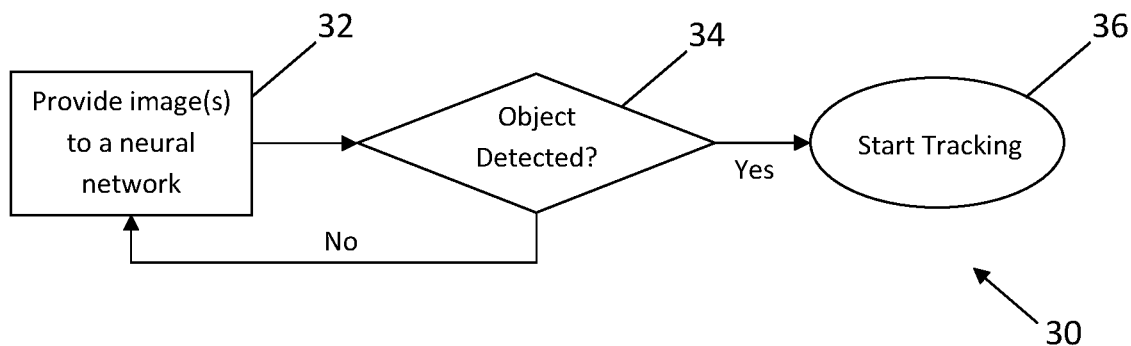

FIG. 3 is a flow chart showing an algorithm, indicated generally by the reference numeral 30, in accordance with an example embodiment. At operation 32, a first image is provided to a neural network (such as a convolutional neural network). The first image may be obtained from the sequence of images that are provided as inputs to device 1. The neural network is used for detecting the first object. At operation 34, it is determined whether the first object is detected. If the first object is detected, the tracking of the first object is started in operation 36. If the first object is not detected, the operation 32 is repeated, for example by providing other images from the sequence of images to the neural network. The operation 32 may be repeated until the first object is detected. The tracking may be performed over one or more of the sequence of images, as the first object may not be stationary. The tracking is performed in order to provide location information of the first object. The output of the algorithm 30 may be an object area (such as a bounding box) corresponding to the first object. The object area may specify vertical and horizontal coordinates of the width and height of the first object (or the width and height of an area including the tracked object). This information can be used to find the position and/or location of the first object relative to the entire image.

Figure 4:
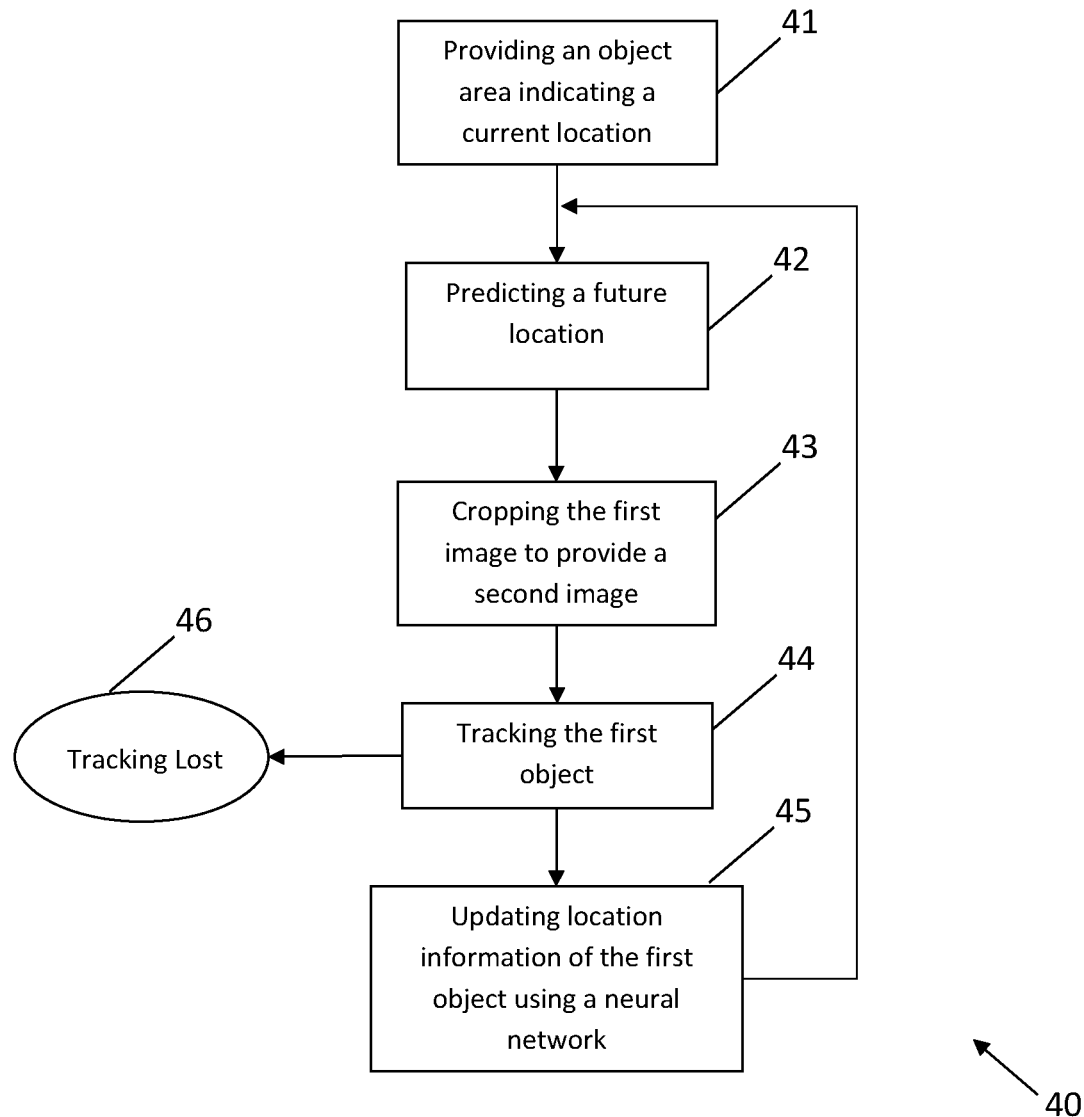

FIG. 4 is a flow chart showing an algorithm, indicated generally by the reference numeral 40, in accordance with an example embodiment. Algorithm 40 comprises operations for tracking the first object. At operation 41, an object area (e.g. a bounding box) is provided based on the detection of the first object in the first image (the object area may be the output of the algorithm 30, as discussed above). The object area is indicative of a current location of the first object. At operation 42, a future location of the first object is predicted, and a prediction of the future location is obtained. At operation 43 (which operation is optional is some embodiments), the first image is cropped to provide a first cropped image based on the current location of the first object and the prediction of the future location of the first object. At operation 44, the first object is tracked in the first cropped image using the neural network. At operation 45, location information of the first object is updated based on the output of the neural network.

In the event that the tracking of the object is lost such that object tracking is not possible in operation 44, then the algorithm 40 terminates at operation 46 with a tracking lost indication. As indicated above, the objection detection algorithm 22 (e.g. the algorithm 30) may be repeated in the event that object tracking is lost.

As described further below, the operation 42 may be implemented using a Kalman filter. Alternative implementations will be apparent to those skilled in the art.

In an example embodiment, the first image may have a large field of view, such that the first object is in a very small part of the first image. In such an example, the current location and the prediction of the future location may indicate that the first object can be tracked even if the first image is cropped into the first cropped image, as the prediction may indicate that it is unlikely that the future location of the first image will be outside the first cropped image. Using the cropped image, i.e. the first cropped image for the tracking the first object and determining updated location of the first object may be more efficient that running the neural network on the full image, i.e. the first image, as the processing resources required to process the first image is likely to be much higher than that required to process the first cropped image. Furthermore, as the images are run through a neural network for object detection, the detection process may be faster if the size of the images is smaller. The neural network may have a threshold input size, and the image may be cropped to match the input size of the neural network. Cropping may be a better way of making the size of the image smaller instead of re-scaling the image, as rescaling may lead to loss of information or detail of the first object.

In an example embodiment, before operation 43, cropping dimensions are determined based on the predicted future location. The cropping dimensions may be used for cropping the first image and/or for cropping one or more images after the first image in the sequence of images. The first object is tracked in operation 44 using the sequence of images. Therefore, when it is predicted that the first object is likely to be within the determined cropping dimensions, the one or more images after the first image are also cropped using the same cropping dimensions. For example, all images in the sequence of images may have the dimensions of 2048×1536 pixels (as all images are obtained from the same source, the dimensions are likely to be the same). The cropping dimensions may be determined as coordinates of each corner of a cropping boundary on the image, such as 500×300 (top-left corner), 1000×300 (top-right corner), 500×800 (bottom-left corner) and 1000×800 (bottom-right corner). As the location information of the first object is updated, the cropping dimensions may also be updated.

In one example embodiment, a control signal is generated for changing a field of view of the camera. The field of view of the camera may be changed based on the current location and a predicted future location of the first object during the tracking stage. If the first object is predicted to move out, or has already moved out of a field of view of the camera, the control signal may be generated for changing the field of view and for continuing to receive images or sequence of images containing the first object. As such, the control signal may be generated when a deviation of the first object away from the centre of the cropping dimensions is higher than a threshold. Alternatively, or additionally, the control signal may be generated in order to obtain a better or clearer view of the first object that is to be tracked. The control signal may be any signal (for example a zoom control and/or a gimbal control) that may be used for changing a field of view of the camera.

Figure 5:
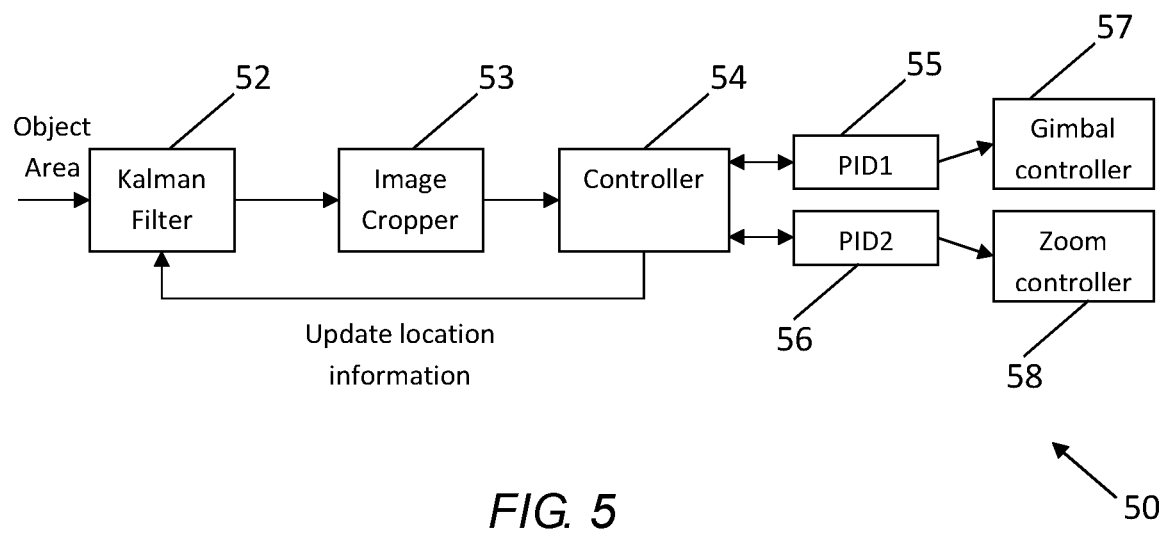
FIG. 5 is a block diagram of a system in accordance with an example embodiment.

FIG. 5 is a block diagram of a system, indicated generally by the reference numeral 50, in accordance with an example embodiment. The system 50 comprises a Kalman filter 52, an image cropper 53, a controller 54, a first proportional-integral-derivation (PID) controller 55, a second proportional-integral-derivation (PID) controller 56, a gimbal controller 57 and a zoom controller 58. The system 50 may be used to implement the algorithm 40, as described further below.

The Kalman filter 52 is initialized using an object area as an input, such as the object area determined in operation 41 (which may be output of the algorithm 30). The Kalman filter 51 is applied to the first image in order to predict the future location of the first object. The prediction of the future location is used, by the image cropper 53, for cropping the first image. Thus, the first image may be cropped into a first cropped image. The controller 54 runs the first cropped image through the neural network for detection and tracking of the first object.

The controller 54 provides updated location information to the Kalman filter 52. On the basis of the updated location information, the Kalman filter 52 generates further predicted future locations for the first object and the image cropper 53 may, in some circumstances (described further below), adjust the cropping of the first object.

In the event that the controller 54 determines that gimbal control is required, then the controller 54 provides a signal to the first PID controller 55, which first PID controller provides control instructions to the gimbal controller 57. For example, if the first object is predicted to be at a location outside of the first cropped image and/or outside the first image, the field of view of a camera used for obtaining the sequence of images may be changed using a gimbal control.

Similarly, in the event that the controller 54 determines that zoom control is required, then the controller 54 provides a signal to the second PID controller 56, which second PID controller provides zoom instructions to the zoom controller 58. For example, if a first object is predicted to be at a location outside of the first cropped image and/or outside the first image, the field of view may be zoomed out in order to locate the first object. Alternatively, the field of view may be zoomed in in order to focus on the first object.

In the system 50, the controller 54 makes use of the neural network output when determining whether gimbal control and/or zoom control is required. This is not essential to all embodiments. For example, the output of the Kalman filter 52 could be used by the controller 54. This might be advantageous if, for example, the neural network output was not yet available, but the output of the filter 52 suggested that a gimbal control and/or zoom control were required.

As shown in FIG. 5, the Kalman filter 52, image cropper 53 and controller 54 provide a control loop for the system 50. It should be noted that in the event that the image is changed under the control of the gimbal controller 57 or the zoom controller 58, control signals may be provided to the controller 54 in order to provide suitable updated image data to the Kalman filter 52.

In one example use of the system 50, location information regarding the first object is updated as the first object is being tracked. For example, the first image is processed, the first object is detected in the first image, the current location and predicted future location of the first object are determined, and cropping dimensions are determined based on the current location and predicted future location. Based on the cropping dimensions, the first image is cropped to the first cropped image by image cropper 53. The first cropped image is run through the neural network for object detection at controller 54, and updated location information is provided to the Kalman filter 52. After the first image is processed, the next image in the sequence of images, such as a second image, is processed. If the current location and predicted future location of the first object in the second image indicates that the first object is predicted to be within the cropping dimensions, the second image may be cropped with the same cropping dimensions to provide a second cropped image at the output of the image cropper 53. The second cropped image is then run through a neural network, the location information of the first object is updated, and the process is repeated. If the current location and predicted future location of the first object in the second image indicates that the first object is not predicted to be within the cropping dimensions or the deviation of the first object from the centre of the cropping dimensions is higher than a threshold, new cropping dimensions may be determined, and the second image may be cropped (by the image cropper 53) with the new cropping dimensions to provide a second cropped image.

The Kaman filter 52 is an estimation library which may be used for predicting a future location of the object being tracked. The Kalman filter 52 is used in two operations: predicting and updating. In the predicting operation, a future location of the object is predicted, where the predicted future location may indicate a location of the object during one or more future time periods before new detection information is received from the neural network. The predicted future location(s) can then be used for updating location information of the first object. The neural network may, for example, process two to three frames per second. Therefore, the prediction of the Kalman filter 52 may be used for updating the location of the first object until new detection information is received from the neural network. As discussed earlier, the prediction of the future location from the Kalman filter 52 may also be used for cropping the image (by the image cropper 53). Over time, the prediction from Kalman filter may accumulate errors or noise which may be corrected with the output from the detection algorithm of the neural network to update the location information.

In an example embodiment, the Kalman filter may determine speed and/or acceleration of the object, and perform prediction of the future location of the object based at least partially on the speed and/or acceleration of the object. An object model may be defined for the object (and each individual objects) at the neural network, such that the object may be observed, and the speed and/or acceleration may be determined based on the model. The neural network may be trained with object models of various objects or various types of objects. The object model may be defined with a constant or varying acceleration value, a constant or varying speed value, or with zero speed value and acceleration value.

The first cropped image may be required to be run through the neural network of the controller 54 in the tracking stage as the orientation (even after the first image was run through the neural network in the detection stage), zoom level, or view of the first object may change, and the neural network may be used for detecting the object at different orientations, zoom levels or views.

Figure 6:
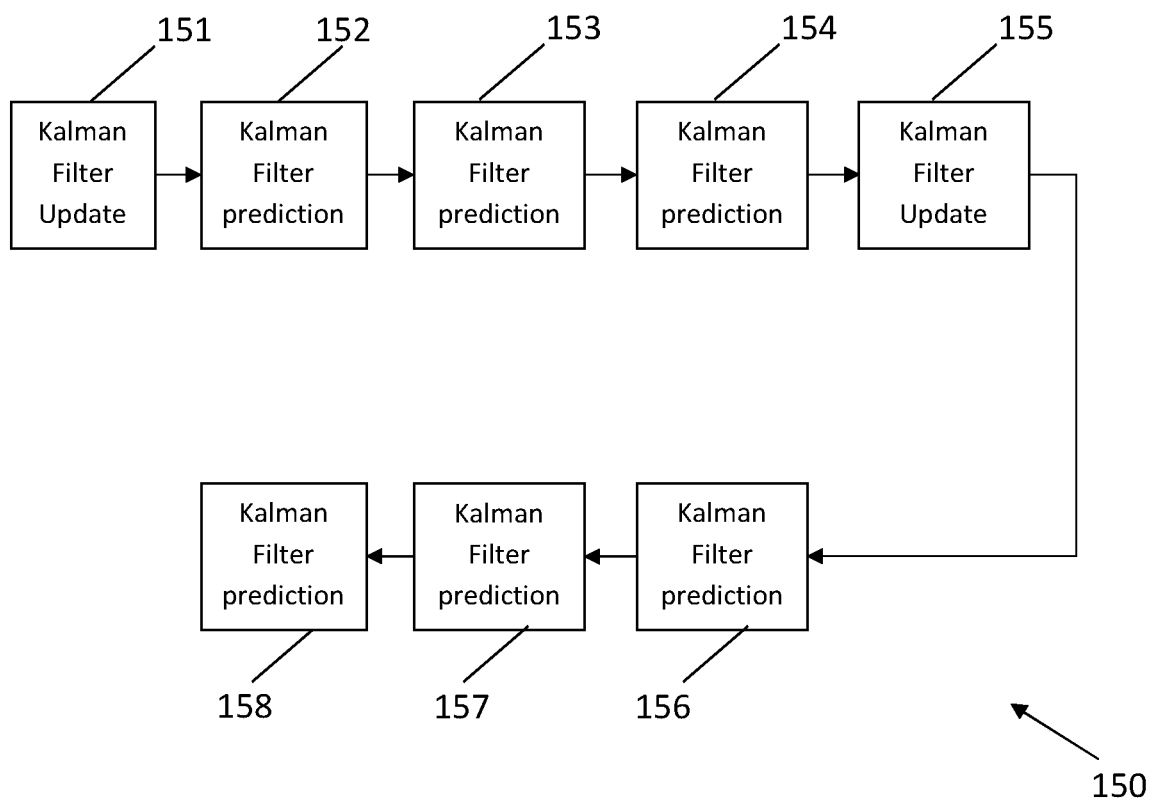
FIG. 6 is a flow chart showing an algorithm in accordance with an example embodiment.

FIG. 6 is a flow chart showing an algorithm, indicated generally by the reference numeral 150, in accordance with an example embodiment. As seen in system 50, the controller 54 provides updated location information to the Kalman filter 52. The object detection at the neural network may run at low speed due to limited resources, such as limited computation power and/or power supply. As such, output from the neural network indicating the current location of the first object may not be received as often as preferred for tracking the first object in real time, or the number of frames computed per second by the neural network (in controller 54) may not be enough for tracking. In order to compensate for the low speed of receiving outputs from the neural network, the Kalman filter is used for predicting the location of the first object. The Kalman filter may be required to be provided with more accurate data regarding the location of the first object from the controller 54, such that a confidence of a prediction may remain higher than a threshold confidence. In algorithm iso, each operation may be an illustration of the function of the Kalman filter at each time instance when location information of the first object needs is provided for smooth tracking of the first object. For example, at operation 151, an input is received from the neural network indicating current location of the first object, and the Kalman filter is updated accordingly. At operation 152, the Kalman filter provides a predicted future location, and the prediction has high confidence, as it is based on the input from the neural network. At operation 153, the Kalman filter provides another predicted future location for location of the first object in the next time instance. The predicted future location provided at operation 153 may have medium confidence as it may be based on the previous predicted location provided in operation 152. Consequently, at operation 154, the Kalman filter provides another predicted future location for the location of the first object in the next time instance, and the predicted future location provided at operation 154 has relatively low confidence because it may be based on two previous predictions. The Kalman filter may be updated again at operation 155 with an input from the neural network. Similar to operations 152, 154, and 154, predictions with relatively high confidence, medium confidence, and low confidence may be provided at operations 156, 157, and 158 respectively. The Kalman filter is updated only when an input is received from the neural network regarding the updated location of the first object. The Kalman filter prediction is performed in between the instances of receiving the input from the neural network. When the Kalman filter prediction is performed consecutively, the probability that the first object is in the predicted location may decrease, as shown in the operations 154 and 158 with the low confidence predicted future location. The probability or confidence of the predicted future location is again raised when an input is received for updated the Kalman filter, as shown in operations 155 and 156. It will be appreciated that the computation power requirements may be lower if the Kalman filter is used for prediction instead of requiring the neural network to produce an output at every time instance.

The flow chart 150 is provided by way of example only; many alternative arrangements are possible. For example, the selection of whether to use the Kalman filter 52 (a motion based model) or the neural network of the controller 54 (an object detection based model) may be based, for example on whether or not the relevant object is within a field of view of the relevant image (for example, whether or not the tracking is lost, as discussed above with reference to the operation 46). Further, although three instances of the Kalman filter are shown in succession, any number of repetitions are possible; moreover, multiple successive uses of the neural network are also possible.

In some embodiments, the control signal may be generated when a deviation (e.g. a prediction of deviation) of the first object away from a centre of the first image or the first cropped image is higher than a threshold.

The prediction of the future location of the first object may be used for tracking the first object. For example, the prediction may be used to determine that there is a high chance that the first object is within the region predicted by the means for predicting the future location of the first object. This prediction may be used in selecting a region to be searched (e.g. minimising a region to be searched), for example by a neural network.

As indicated above, FIG. 7 to 13 show images being processed in accordance with example embodiments.

Figure 7:
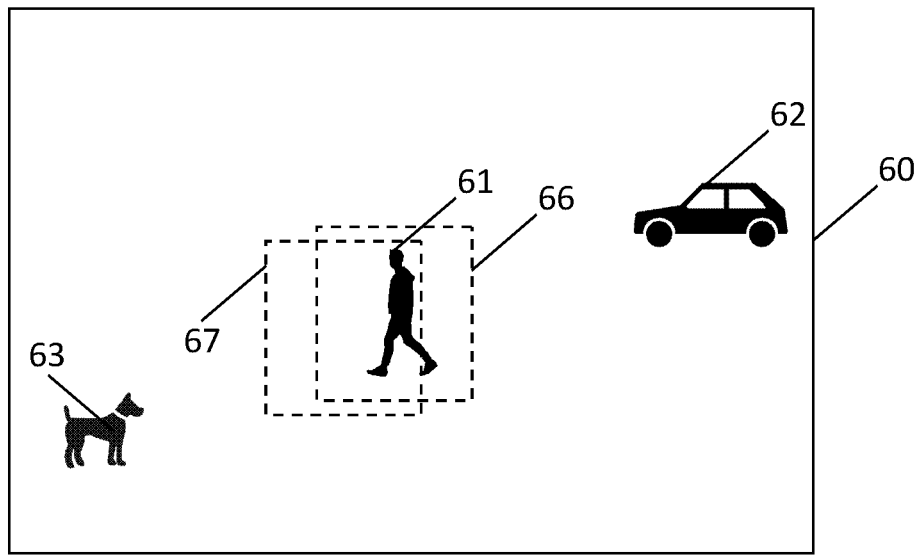
FIGS. 7 to 13 show images being processed in accordance with example embodiments.

FIG. 7 shows an image, indicated generally by the reference numeral 60, being processed in accordance with an example embodiment. Image 60 may be a first image of a sequence of images. Image 60 comprises a first object 61 (a person), a second object 62 (a car), and a third object 63 (a dog). By way of example, the device 1 of the system 10 may receive an instruction to detect and track the first object 61. The first object 61 may be identified as a person, or as a specific person. The ability of the system 10 to identify and track different objects is dependent on the training of the neural network, as described further below.

Viewing FIG. 7 in conjunction with FIG. 3 and FIG. 4, the image 60, is provided to a neural network at operation 32, and when the first object 61 is detected at operation 34, tracking of the first object 61 is started at operation 36. An object area, such as the object area 66, is provided or generated in operation 41 of the algorithm 40. The object area 66 is indicative of the current location of the first object 61.

Assume that the first object 61 (the person) is moving from right to left in the image 60. At operation 42 of the algorithm 40, a future location of the first object 61 is predicted, and a predicted future location 67 is provided. As only the first object 61 is an object of interest, the second and third objects 62 and 63 respectively are not detected or tracked.

In an example embodiment, the location of the object, such as the first object 61, is determined with respect to the image, such as the image 60. The first object is detected and the location is provided as an object area. The object area may be defined with starting coordinates such as x and y, and with width (w) and height (h). The coordinates x and y may be the horizontal and vertical coordinates of the top left corner of the object area, such as the object area 66. This may provide detailed information of the current location of the object. When tracking of the object is performed, information is required regarding the current location of the object, and a direction towards which the object is moving. The position of the camera may be changed accordingly. For example, if the object is located or is moving towards the left side of the image, the gimbal control may be used for moving the gimbal towards the left, such that the object may be seen at around the centre of the field of view of the camera. Similarly, if the object is located or is moving towards the top side of the image, the gimbal control may be used for moving the gimbal upwards so that the object may be seen at around the centre of the field of view of the camera.

Figure 8:
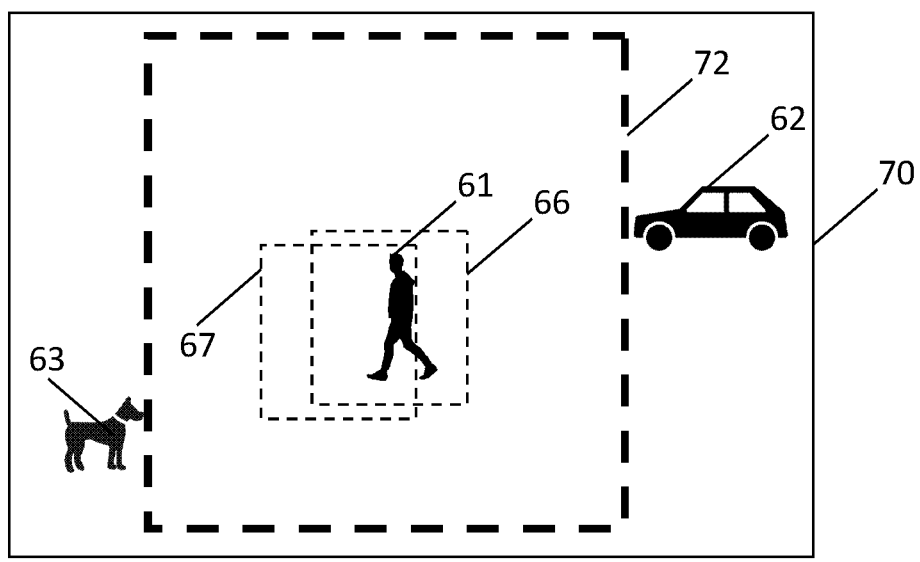

FIG. 8 shows an image, indicated generally by the reference numeral 70, being processed in accordance with an example embodiment. Image 70 may be the first image. Viewing FIG. 8 in conjunction with FIGS. 4 to 7, when the future location is predicted, the first image 70 may be cropped according to the cropping dimensions 72 to generate a first cropped image at operation 43, as the predicted future location may indicate that it is likely that the first object 61 will be within the cropping dimensions 72 for the next few images in the sequence of images. The next few images may also be cropped based on the cropping dimensions 72.

Figure 9:
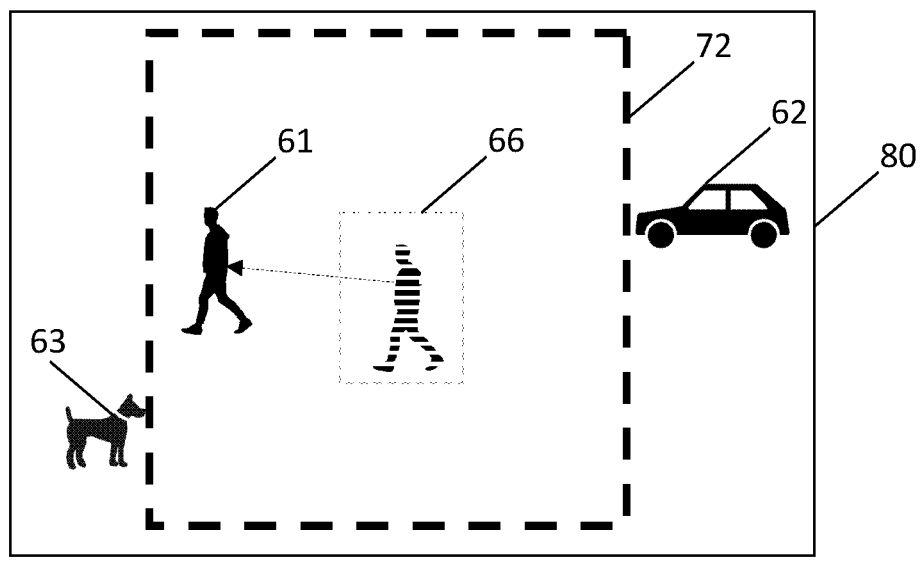

FIG. 9 shows an image, indicated generally by the reference numeral 80, being processed in accordance with an example embodiment. Image 80 may be another one of the images obtained (after the first image) in the sequence of images. When the object 61 is detected in image 80, it may be determined that the first object 61 is moving away from the centre of the cropping dimensions 72, such that the deviation of the first object away from the centre of the first cropped image is higher than a threshold. The movement of the first object 61 relative to the previous location (current location indicated by object area 66 of previous image 70) is illustrated by the dotted arrow. As discussed earlier, when the deviation of the first object away from the centre of the cropping dimensions is determined to be higher than the threshold, a control signal is generated for changing a field of view of the camera. Example changes of field of view are shown in FIGS. 10 to 13.

Figure 10:
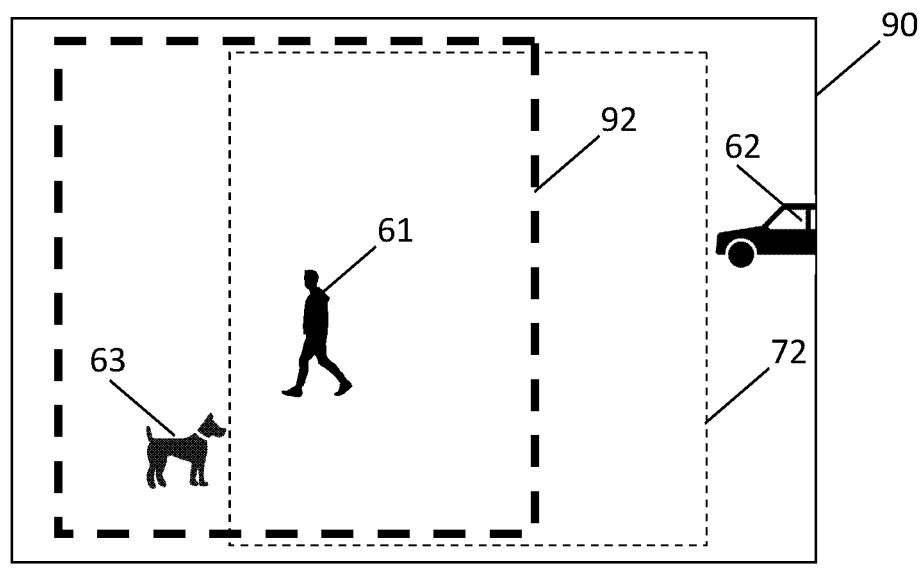

FIG. 10 shows an image, indicated generally by the reference numeral 90, being processed in accordance with an example embodiment. Image 90 may be obtained after a control signal provided by the controller 54 to the first PID controller 55 is generated and a gimbal control is received at a camera, such that the field of view of the camera is changed using a gimbal. When the field of view is changed, new cropping dimensions 92 are provided based at least partially on a current location and a predicted future location of the first object 61. It can be seen that the field of view has been changed such that the first object 61 is approximately at the centre of the cropping dimensions 92. As such, the deviation of the first object 61 away from the centre of the cropping dimensions 92 is lower than the threshold.

Figure 11:
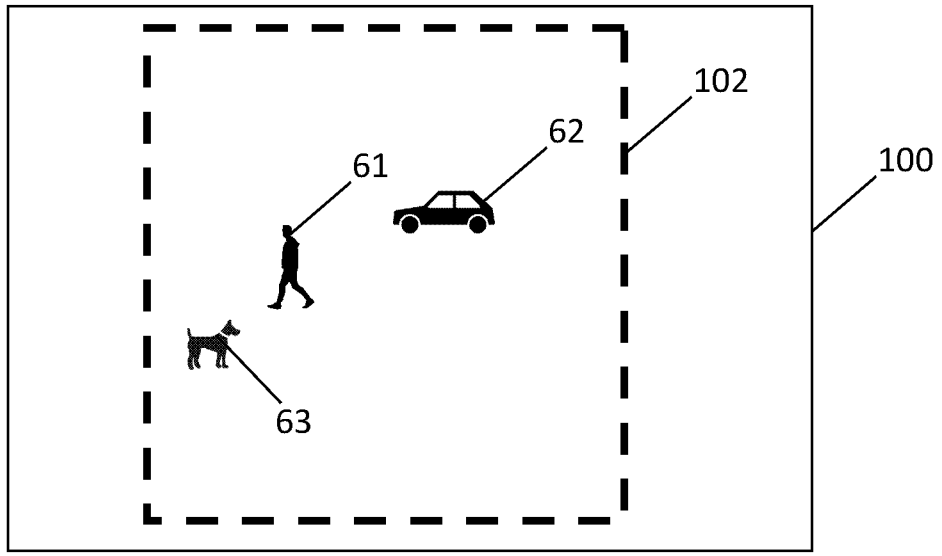

FIG. 11 shows an image, indicated generally by the reference numeral 100, being processed in accordance with an example embodiment. Image 100 may be obtained after a control signal is provided by the controller 54 to the second PID controller 56 is generated and zoom control is received at the camera, such that the field of view of the camera is changed using the zoom feature of a lens of the camera and zooming out. When the field of view is changed, a new cropping dimension 102 is provided based at least partially on a current location and a future location of the first object 61. It can be seen that the field of view has been changed such that the deviation of the first object 61 away from the centre of the cropping dimensions 102 is lower than the threshold.

Figure 12:
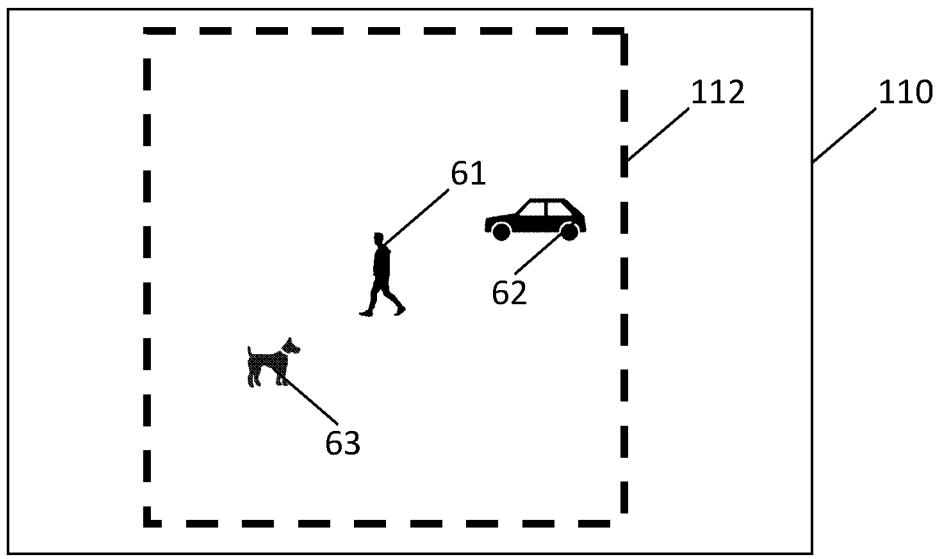

FIG. 12 shows an image, indicated generally by the reference numeral 110, being processed in accordance with an example embodiment. Image 110 shows that the first object 61 is approximately at the centre of the cropping dimensions 112, and the zoom level of the camera is allowing the other objects, such as the second object 62 and the third object 63 to also be inside the cropping dimensions 112. It may be determined that a better view of the first object 61 may be obtained by zooming in the lens of the camera to focus on the first object 61.

Figure 13:
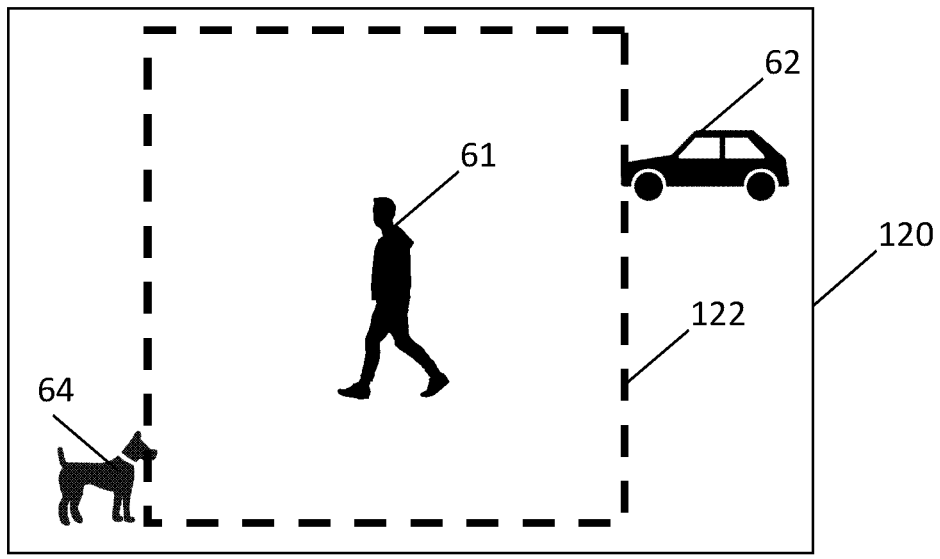

FIG. 13 shows an image, indicated generally by the reference numeral 120, being processed in accordance with an example embodiment. Image 120 may be obtained after a control signal provided by the controller 54 to the second PID controller 56 is generated and a zoom control is received at the camera, such that the field of view of the camera is changed using the zoom feature of a lens of the camera and zooming in. When the field of view is changed, a new cropping dimension 122 is provided based at least partially on a current location and a future location of the first object 61. It can be seen that the field of view has been changed such that the first object 61 is approximately at the centre of the cropping dimensions 122, and a clearer view of the first object 61 is obtained, compared to the view in image 110.

FIGS. 7 to 13 are provided by way of example only. Further example embodiments are possible. For simplicity and ease of illustration, the relative location and tracking of the first object 61, the second object 62 and the third object 63 are shown to be stationary in the above examples. Of course, the objects may be moving in example embodiments.

As described above, the detection operation 22 and the tracking operation 24 both make use of a neural network, such as a convolutional neural network. Indeed, the same neural network may be used for both operations.

Figure 14:
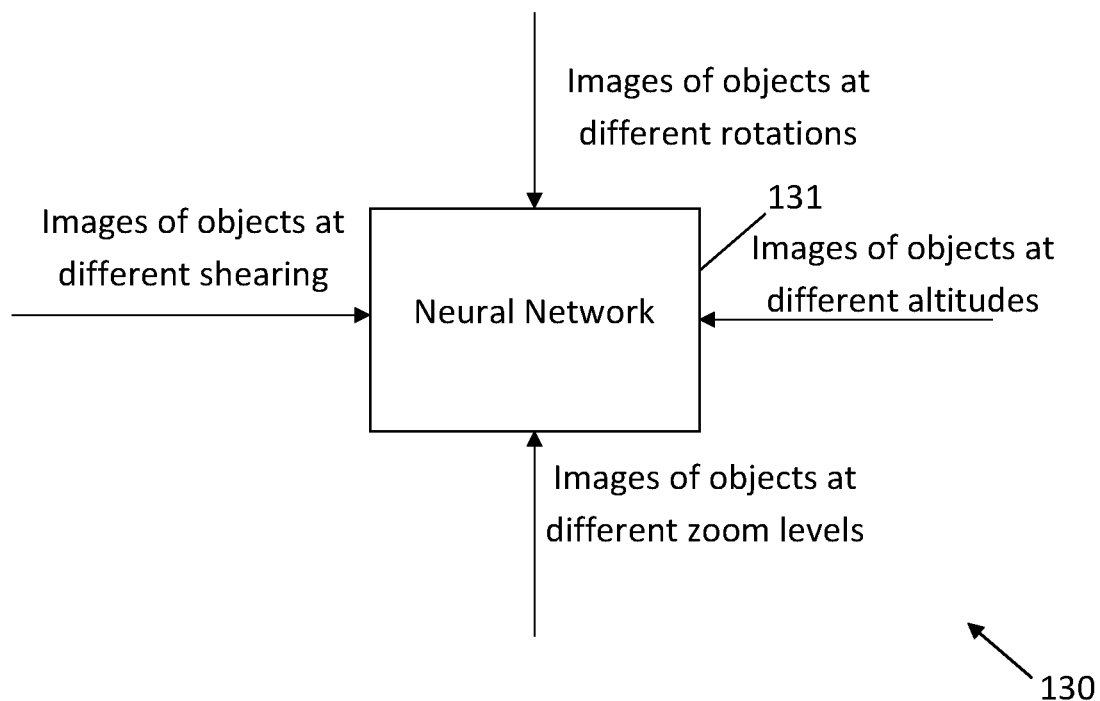
FIG. 14 is a block diagram of a system in accordance with an example embodiment.

FIG. 14 is a block diagram of a system, indicated generally by the reference numeral 130, in accordance with an example embodiment. System 130 comprises a neural network 131, and various training inputs for training the neural network 131. The neural network 131 may be used for implementing the operations 22 and 24, as described in detail above.

During a training stage of the neural network 131, a large amount of data is collected such that the object detection is accurate. For example, in order to train the neural network 131 for detection of a first object, such as the first object 61, images of the first object are collected at different altitudes, different zoom levels, different rotations, and/or different shearing. Similarly, the neural network 131 may be trained for detection of a plurality of objects using images of the plurality of objects collected at different altitudes, different zoom levels, different rotations, and/or different shearing. In some embodiments, additional training data can be obtained by manipulating existing training data (e.g. by flipping, rotating and/or cropping existing images in different ways). The training data may be annotated such that the neural network 131 can be trained by supervised learning. In this way, the neural network 131 can be used to detected objects for which it is trained.

By providing many different example images at different scales during a training phase, the neural network 130 can be largely scale invariant.

Figure 15:
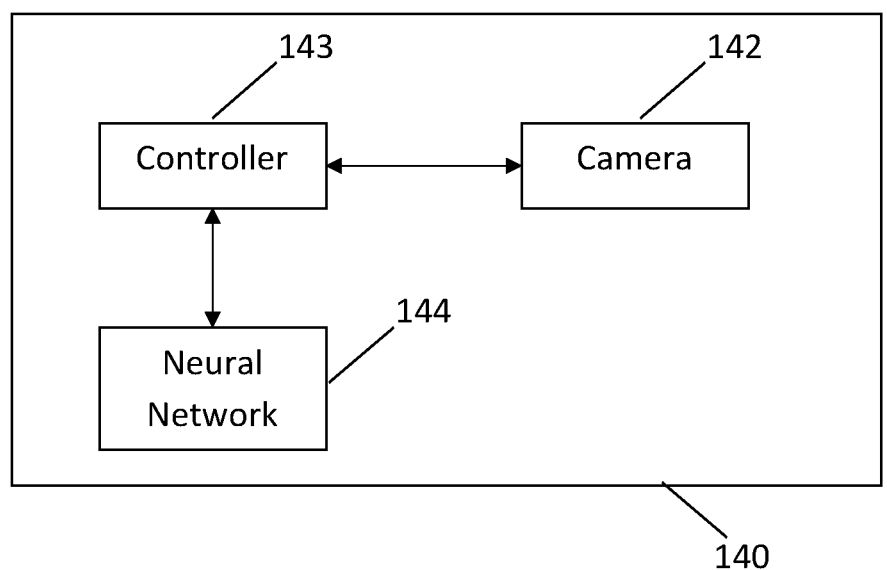
FIG. 15 is a block diagram of a system in accordance with an example embodiment.

FIG. 15 is a block diagram, of a system, indicated generally by the reference numeral 140, in accordance with an example embodiment. The system 140 comprises a camera 142, a controller 143 and a neural network 144. The neural network 144 may be the trained neural network 131 described above.

The system 140 may be a drone or some other unmanned aerial vehicle that uses the camera 142 to take images of a scene for the purposes of detecting and tracking objects, as described in detail above. The camera 142 may be a high-definition camera having a three-axis gimbal under the control of the controller 143. Thus, the camera 142 may be able to obtain a sequence of images for use in the algorithms 20, 30, 40 and 150 described above.

The images obtained by the camera 142 may be provided, under the control of the controller 143, to the neural network 144. The neural network may detect objects on the basis of training data (thereby implementing the operations 32, 34 and 44 described above).

The controller 143 may be required to process data relatively quickly in order to provide real-time control of the camera 142. Thus, it may be advantageous to provide the neural network 144 locally (e.g. when the system 140 is implemented as a drone). Thus, it may be advantageous to train the neural network before deploying the neural network in the system 140.

The system 140 may be operable at many different heights relative to a target. Images of such a target may therefore be provided to the controller 143 at different scales. The training of the neural network 144 on the basis of images at different altitudes and zoom levels, as described above, may be particularly advantageous when the system 140 is implemented as a drone.

In an example embodiment, multiple devices, such as device 1, may be used for tracking one or more objects. Each device may comprise at least one camera for obtaining sequences of images that may be a part of videos captured in real-time by the cameras. Each device may be used for tracking different objects. For example, if multiple objects, such as a car, a dog, and a person, need to be tracked at the same time, each of the multiple devices may be used for tracking a single object. For example, a first device is configured to track the first object 61 (person), a second device is configured to track a second object 62 (car), and a third device is configured to track a third object 63 (dog). The multiple devices may be able to communicate with each other regarding the location of the objects being tracked. It would be appreciated that in a scenario where the multiple objects are moving in different directions, it may be useful to have individual devices tracking each object. Furthermore, the multiple objects may also have some relation, such that knowing the location of one object may facilitate tracking of another object. Alternatively, or in addition, multiple devices may be used for tracking the same object. When multiple devices are used for tracking the same object, the location information of the object may be more accurate, as the location information provided by one device may be verified using the location information of another device. Furthermore, using multiple devices allows the combined field of view to be much larger, such that it is more likely that the object will remain within the combined field of view without requiring gimbal control or zoom control. For example, if a car (such as the second object 62) is being tracked, and the car is moving at high speed, the gimbal control or zoom control may not be performed fast enough to keep the car within the field of view of a single device. As such, the larger combined field of view may be beneficial for tracking high-speed objects.

Figure 16:
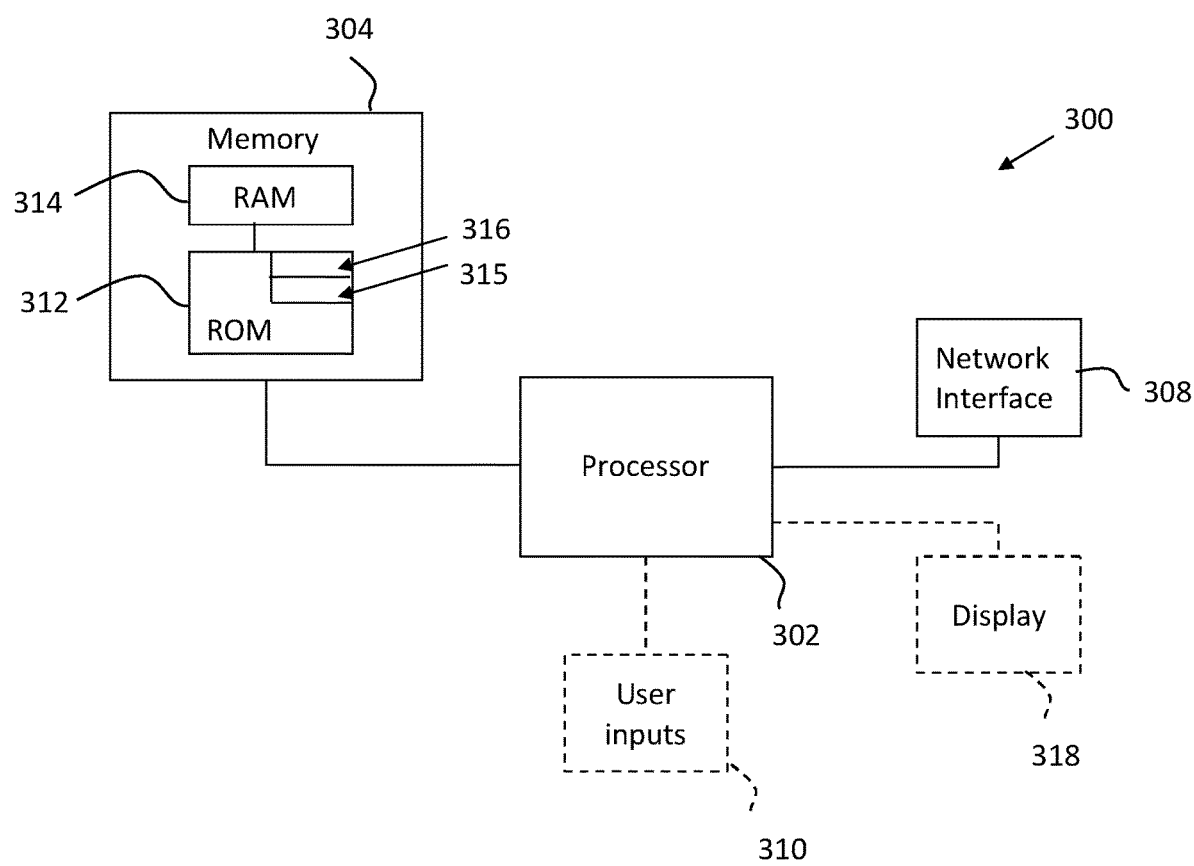
FIG. 16 is a block diagram of components of a system in accordance with an exemplary embodiment.

For completeness, FIG. 16 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 30, 40, and 150 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17A:
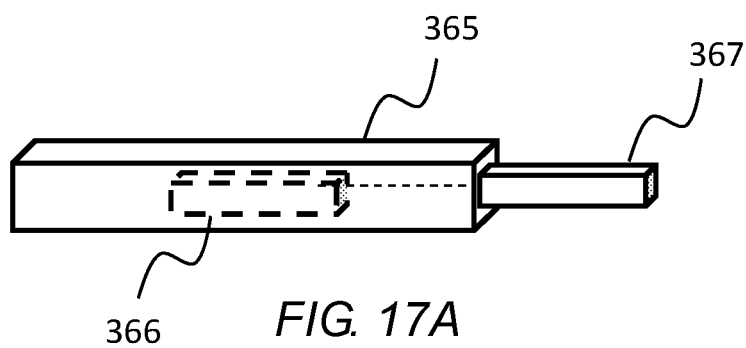
FIGS. 17A and 17B show tangible media, respectively a removable non-volatile memory unit and a compact disc (CD) storing computer-readable code which when run by a computer perform operations according to embodiments.
Figure 17B:
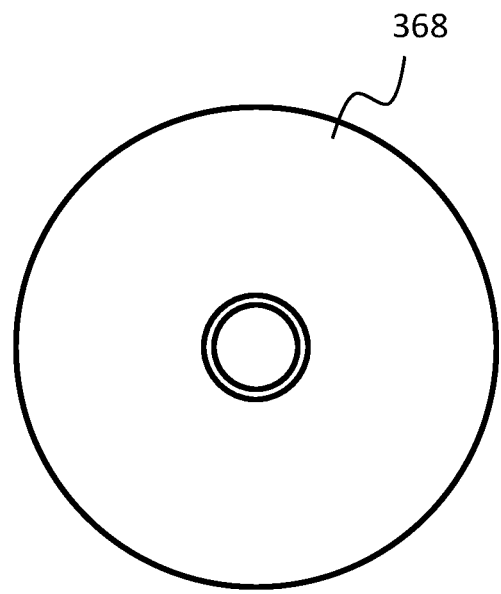

FIGS. 17A and 17B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 3, 4 and 6 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification. For example, although the use of a Kalman filter is described herein, this is not essential to all embodiments. For example, a different means for predicting a future location of an object could be used. Moreover, in some embodiments, an Extended Kalman filter may be used.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory including computer program code, the at least one memory and the computer program code configured to, with the at least one processor, cause the apparatus at least to perform the following:
   detect a first object in a first image of a sequence of images using a neural network, wherein the detected first object provides an object area indicative of a first location of the first object; and
   track the first object, wherein the tracked first object further causes the apparatus at least to perform:
      generate a predicted future location of the first object using a Kalman filter or an extended Kalman filter; and
      generate an updated location of the first object using the neural network in some instances and the Kalman filter or the extended Kalman filter in other instances.

2. An apparatus according to claim 1, wherein the at least one memory and the computer program code are further configured to, with the at least one processor, cause the apparatus to select whether to use (i) the Kalman filter or the extended Kalman filter or (ii) the neural network based on whether or not an object is within a field of view of an image.

3. An apparatus according to claim 1, wherein a plurality of predicted future locations of the first object are generated using the Kalman filter or the extended Kalman filter prior to receiving the updated location from the neural network.

4. An apparatus as claimed in claim 1, wherein the at least one memory and the computer program code are configured to, with the at least one processor, cause the apparatus to generate the predicted future location of the first object by generating multiple prediction instances using the Kalman filter or the extended Kalman filter for each updated location of the first object that was generated using the neural network.

5. An apparatus as claimed in claim 1, wherein the at least one memory and the computer program code are further configured to, with the at least one processor, cause the apparatus to crop the first image to provide a first cropped image, at least partially based on the predicted future location and/or the updated location of the first object, wherein the first cropped image includes said first object.

6. An apparatus as claimed in claim 1, wherein the at least one memory and the computer program code are further configured to, with the at least one processor, cause the apparatus to generate a control signal for changing a field of view of a camera for obtaining the sequence of images, wherein the control signal is generated when a deviation of the first object away from a center of the first image or the first cropped image is higher than a threshold.

7. An apparatus as claimed in claim 6, wherein the control signal comprises a zoom control signal and/or a gimbal control signal.

8. An apparatus as claimed in claim 1, wherein the apparatus is a drone or an unmanned aerial vehicle.

9. A method comprising:
   detecting a first object in a first image of a sequence of images using a neural network, wherein the detected first object provides an object area indicative of a first location of the first object; and
   tracking the first object, wherein tracking the first object comprises:
      generating a predicted future location of the first object using a Kalman filter or an extended Kalman filter; and
      generating an updated location of the first object using the neural network in some instances and the Kalman filter or the extended Kalman filter in other instances.

10. A method according to claim 9, further comprising selecting whether to use (i) the Kalman filter or the extended Kalman filter or (ii) the neural network based on whether or not an object is within a field of view of an image.

11. A method according to claim 9, wherein a plurality of predicted future locations of the first object are generated using the Kalman filter or the extended Kalman filter prior to receiving the updated location from the neural network.

12. A method as claimed in claim 9, wherein generating the predicted future location of the first object comprises generating multiple prediction instances using the Kalman filter or the extended Kalman filter for each updated location of the first object that was generated using the neural network.

13. A method as claimed in claim 9, further comprising cropping the first image to provide a first cropped image, at least partially based on the predicted future location and/or the updated location of the first object, wherein the first cropped image includes said first object.

14. A method as claimed in claim 9, further comprising generating a control signal for changing a field of view of a camera for obtaining the sequence of images, wherein the control signal is generated when a deviation of the first object away from a center of the first image or the first cropped image is higher than a threshold.

15. A method as claimed in claim 14, wherein the control signal comprises a zoom control signal and/or a gimbal control signal.

16. A non-transitory computer-readable medium storing a computer program comprising instructions for causing an apparatus to perform at least the following:
 detect a first object in a first image of a sequence of images using a neural network, wherein the detected first object provides an object area indicative of a first location of the first object; and
 track the first object, wherein tracking the first object comprises:
  generating a predicted future location of the first object using a Kalman filter or an extended Kalman filter; and
  generating an updated location of the first object using the neural network in some instances and the Kalman filter or the extended Kalman filter in other instances.

17. A non-transitory computer-readable medium according to claim 16, wherein the computer program further comprises instructions for causing the apparatus to select whether to use (i) the Kalman filter or the extended Kalman filter or (ii) the neural network based on whether or not an object is within a field of view of an image.

18. A non-transitory computer-readable medium according to claim 16, wherein a plurality of predicted future locations of the first object are generated using the Kalman filter or the extended Kalman filter prior to receiving the updated location from the neural network.

19. A non-transitory computer-readable medium as claimed in claim 16, wherein the instructions for causing the apparatus to generate the predicted future location of the first object comprise instructions for causing the apparatus to generate multiple prediction instances using the Kalman filter or the extended Kalman filter for each updated location of the first object that was generated using the neural network.

20. A non-transitory computer-readable medium as claimed in claim 16, wherein the computer program further comprises instructions for causing the apparatus to crop the first image to provide a first cropped image, at least partially based on the predicted future location and/or the updated location of the first object, wherein the first cropped image includes said first object.

* * * * *